United States Patent
Walch et al.

(10) Patent No.: US 8,037,666 B2
(45) Date of Patent: Oct. 18, 2011

(54) MOWER WITH AN LIGHTENING DEVICE INCLUDING TORSION BARS

(75) Inventors: Martin Walch, Dettwiller (FR); Bernard Wattron, Haegen (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 12/990,907

(22) PCT Filed: May 5, 2009

(86) PCT No.: PCT/FR2009/000529
§ 371 (c)(1),
(2), (4) Date: Nov. 3, 2010

(87) PCT Pub. No.: WO2009/141527
PCT Pub. Date: Nov. 26, 2009

(65) Prior Publication Data
US 2011/0047947 A1    Mar. 3, 2011

(30) Foreign Application Priority Data

May 6, 2008  (FR) ..................... 08 52994

(51) Int. Cl.
*A01D 34/00* (2006.01)
(52) U.S. Cl. ....................................................... 56/15.8
(58) Field of Classification Search ................... 56/15.8, 56/14.7, 6, 208, 209, 11.9, 14.9, 15.7
See application file for complete search history.

(56) References Cited

U.S. PATENT DOCUMENTS

| 4,519,188 | A |   | 5/1985  | Webster et al. |
|-----------|---|---|---------|----------------|
| 4,838,013 | A | * | 6/1989  | Louet Feisser et al. ......... 56/13.6 |
| 4,984,776 | A | * | 1/1991  | Smith ........................... 267/276 |
| 5,060,462 | A |   | 10/1991 | Helfer et al. |
| 5,120,032 | A | * | 6/1992  | Smith ........................... 267/273 |
| 5,178,406 | A | * | 1/1993  | Reynolds ............... 280/124.106 |
| 5,417,042 | A | * | 5/1995  | Walch et al. ........................ 56/6 |
| 5,423,165 | A |   | 6/1995  | Walch et al. |
| 5,794,424 | A |   | 8/1998  | Ermacora et al. |
| 5,992,133 | A | * | 11/1999 | Walch et al. ........................ 56/6 |
| 6,085,501 | A | * | 7/2000  | Walch et al. ............... 56/10.2 E |
| 6,269,619 | B1|   | 8/2001  | Walch et al. |
| 6,381,935 | B1|   | 5/2002  | Wattron et al. |
| 6,912,832 | B1|   | 7/2005  | Thompson et al. |

(Continued)

FOREIGN PATENT DOCUMENTS

EP    0 619 063    10/1994

(Continued)

OTHER PUBLICATIONS

International Search Report issued Aug. 24, 2010 in PCT/FR09/000529 filed May 5, 2009.

*Primary Examiner* — Arpad Fabian-Kovacs
(74) *Attorney, Agent, or Firm* — Oblon, Spivak, McClelland, Maier & Neustadt, L.L.P.

(57) ABSTRACT

A mower comprising a chassis carrying at least one harvesting mechanism and a lightening device of the at least one harvesting mechanism. The lightening device includes at least one torsion bar which is connected to a transverse beam of the chassis and which carries a lever on one of the ends of which a rod is articulated which is directed towards the harvesting mechanism and which is itself articulated on the harvesting mechanism or its suspension device.

9 Claims, 5 Drawing Sheets

U.S. PATENT DOCUMENTS

| | | |
|---|---|---|
| 2003/0140610 A1* | 7/2003 | Boyko .......................... 56/14.9 |
| 2005/0279071 A1 | 12/2005 | Thompson et al. |
| 2008/0163599 A1* | 7/2008 | Funk et al. ..................... 56/341 |
| 2009/0183484 A1* | 7/2009 | Funk et al. ..................... 56/208 |
| 2009/0277150 A1 | 11/2009 | Walch |

FOREIGN PATENT DOCUMENTS

| | | |
|---|---|---|
| FR | 2 560 485 | 9/1985 |
| FR | 2 654 897 | 5/1991 |
| FR | 2 786 977 | 6/2000 |

* cited by examiner

MOWER WITH AN LIGHTENING DEVICE INCLUDING TORSION BARS

BACKGROUND OF THE INVENTION

1. Field of the Invention

The present invention concerns a mower comprising:
- a chassis having in particular a transverse beam and two lateral uprights provided with wheels,
- a connecting means allowing said chassis to be connected to a motor vehicle,
- at least one harvesting mechanism provided with cutting elements,
- a suspension device connecting said harvesting mechanism to the chassis, allowing a heightwise displacement of said harvesting mechanism with respect to the chassis,
- a lightening device of said harvesting mechanism.

2. Discussion of the Background

In the known mowers of this type, the lightening device is generally constituted by draw-springs arranged between the chassis and the suspension device. These springs then exert an upwards traction on the suspension device and the harvesting mechanism and thus transfer part of their weight on the chassis. This lightening prevents the harvesting mechanism from resting too heavily on the ground. It can thus easily follow the unevennesses of the ground. This reduces the risk of mistreatment of the plant cover, which could result from too strong a pressure of said mechanism on the ground. The power to be developed for moving the machine during work can also be reduced. Finally, the wear of the parts of the harvesting mechanism which rub on the ground is less rapid.

The draw-springs which are currently known are, however, voluminous and bulky, in particular when the mower has a large working width. There is also a risk of the jamming of products between the turns of these springs, which could be harmful to their operation. Finally, their cost is relatively high.

The document FR 2 786 977 describes a mower with a lightening device constituted by draw-springs fixed laterally to the chassis and indicates that these draw-springs can be replaced by torsion bars.

SUMMARY OF THE INVENTION

The present invention has the aim of proposing a different lightening device.

For this purpose, an important feature of the invention consists in that the lightening device is constituted by torsion bars which are connected to the transverse beam of the chassis and each of which is composed of a tube in the interior of which a stem is arranged with a first end which is connected to said tube by means of a sleeve and with a second end which passes beyond said tube and which carries a lever on one of the ends of which a rod is articulated which is directed towards the harvesting mechanism and which is itself articulated on said harvesting mechanism or on its suspension device.

These torsion bars exert, by means of levers and rods, an upwards traction on the harvesting mechanism or on the suspension device, which lightens said mechanism. These torsion bars take up little space, are easy to implement and are of low cost. In addition, their efficiency is not altered by products which would come to accumulate against them.

Other features and advantages of the invention will emerge from the following description with reference to the attached drawings which represent, by way of non-restrictive example, an embodiment of the mower according to the invention.

DESCRIPTION OF THE PREFERRED EMBODIMENT

Figure 1:
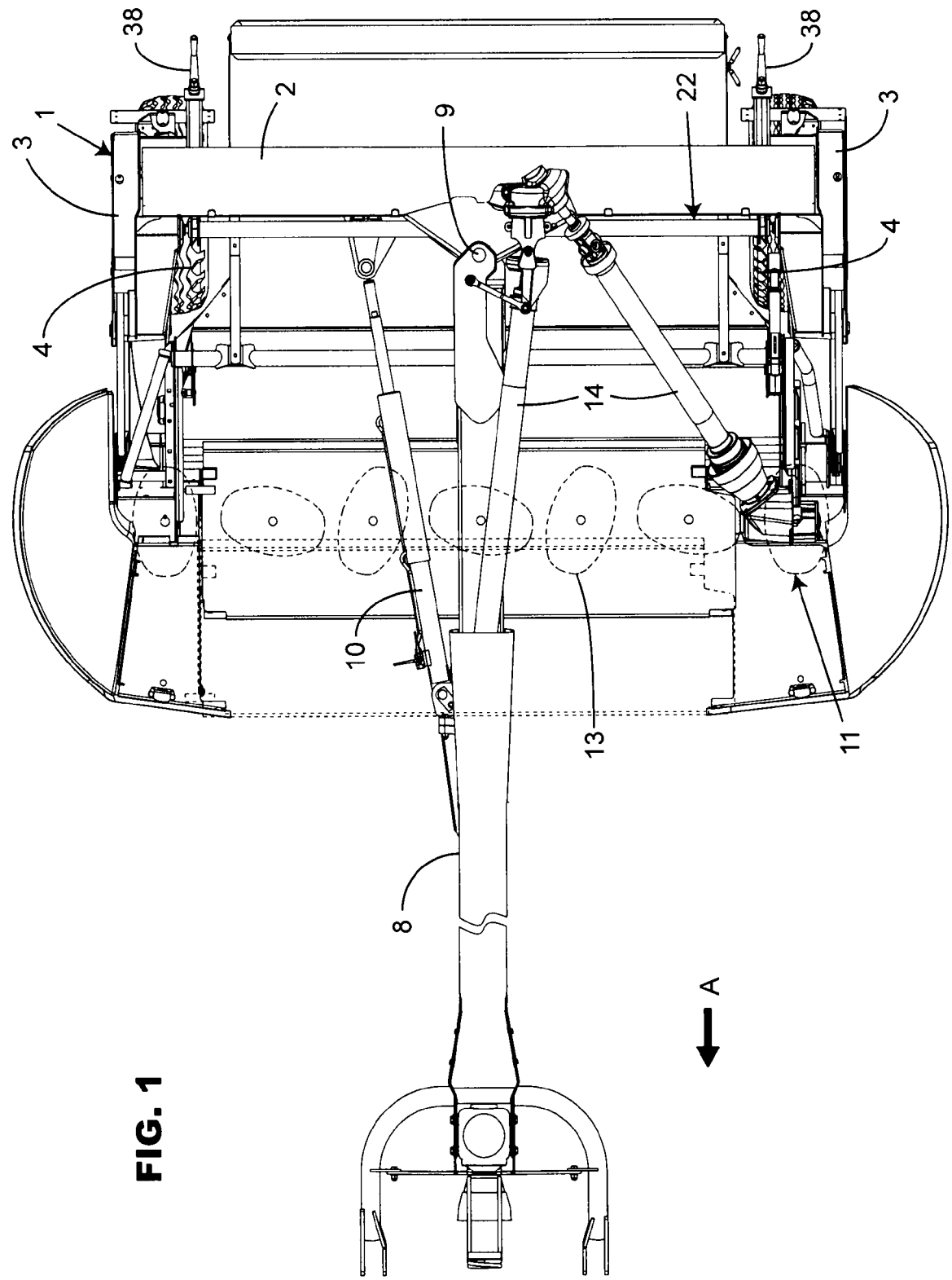
FIG. 1 represents a top view, partially in section, of a machine according to the invention in transport position.
Figure 2:
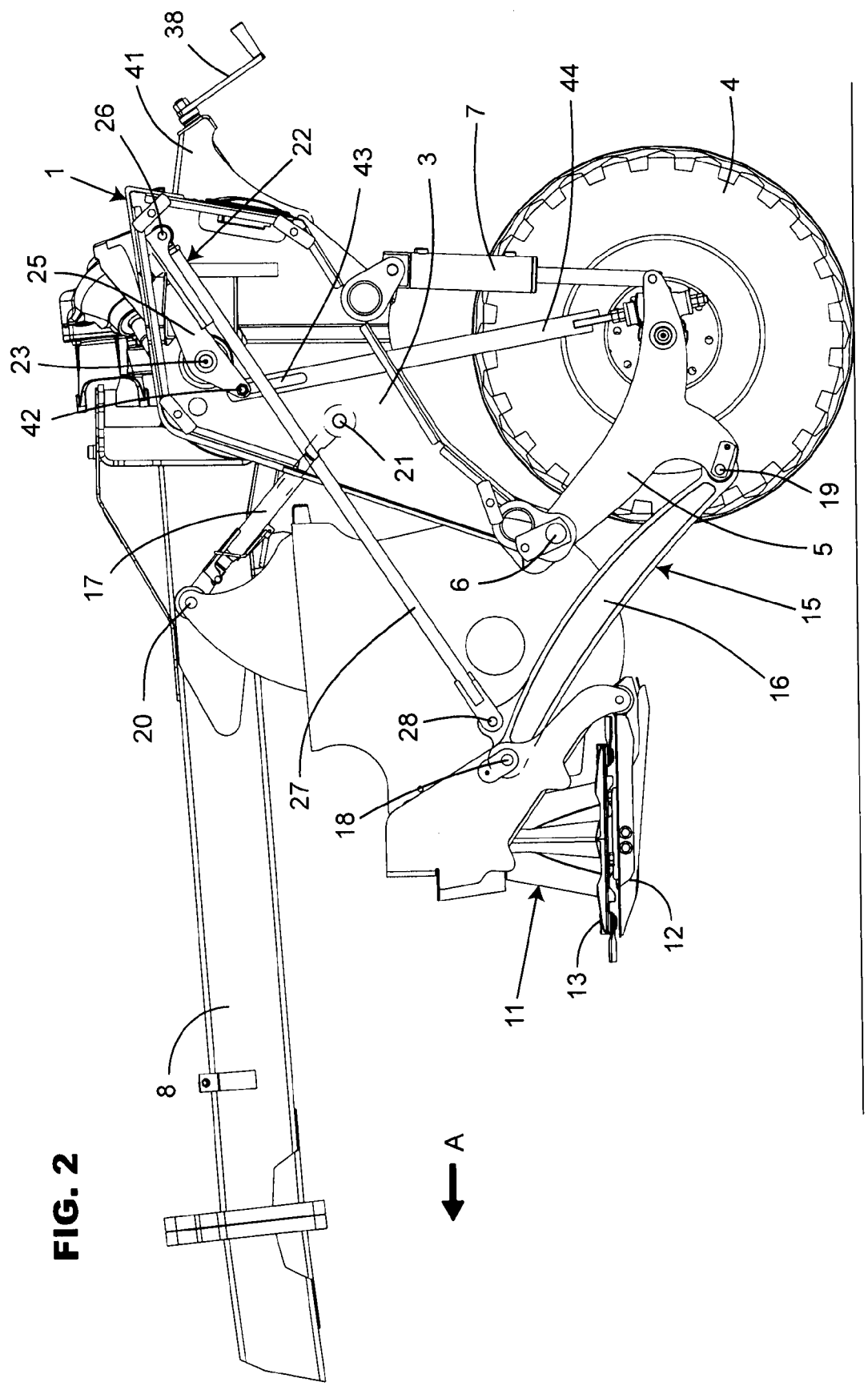
FIG. 2 represents a side view, partially in section, of the mower of FIG. 1.
Figure 3:
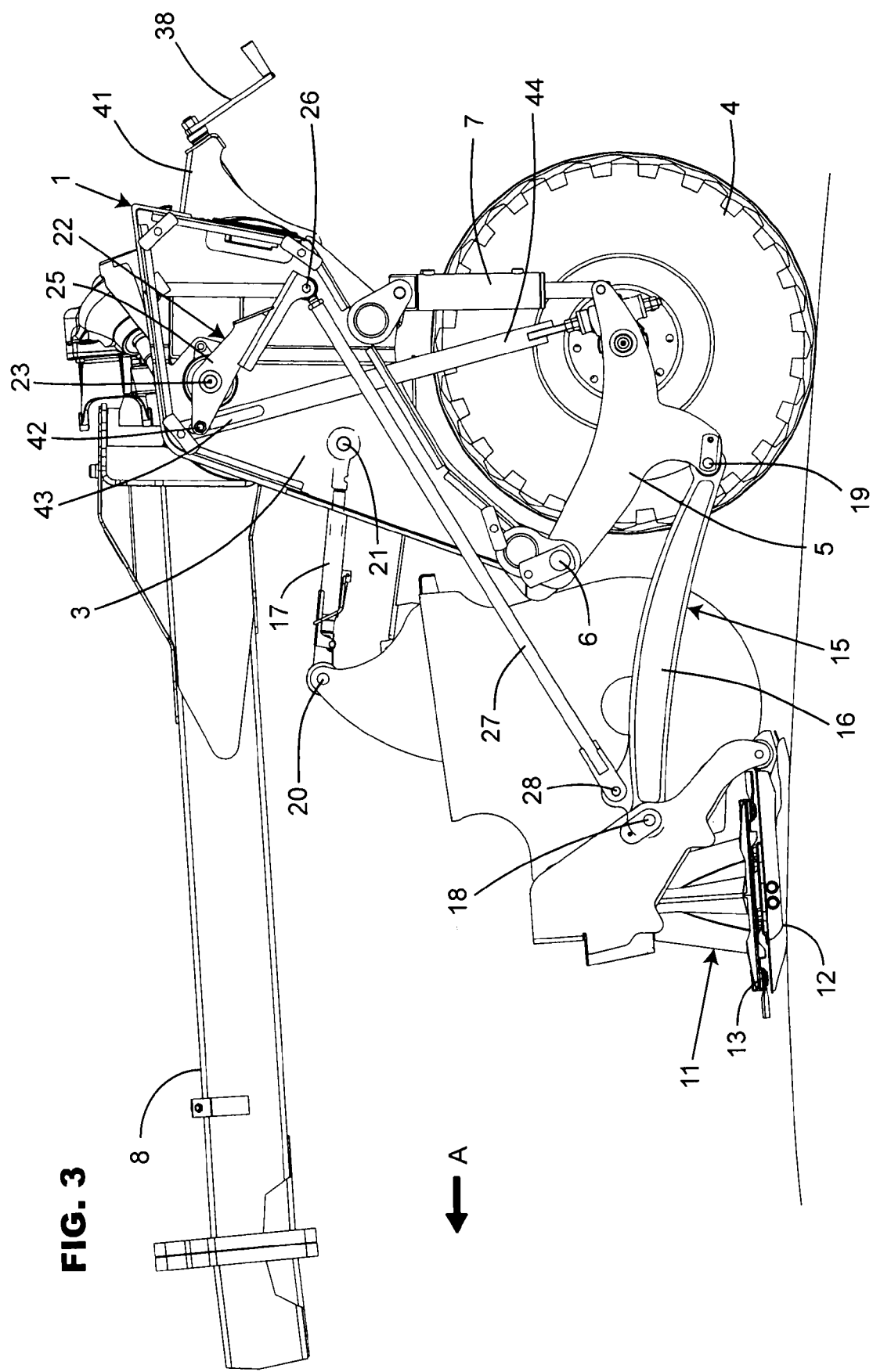
FIG. 3 represents a side view, partially in section, of the mower in work position.

As represented in FIGS. 1 to 3, the mower according to the invention comprises a chassis 1 having in particular a transverse beam 2 and two lateral uprights 3 provided with wheels 4. Each of these wheels 4 is mounted on a balance bar which is articulated by means of an axis 6 on the corresponding lateral upright 3. Between each balance bar 5 and the chassis 1 a hydraulic jack 7 is arranged, allowing said chassis 1 to be displaced heightwise with respect to the wheels 4. A connecting means 8 such as a drawbar is articulated on a substantially vertical axis 9 of said chassis 1. This connecting means 8 is displaceable about said articulation axis 9 by means of a hydraulic jack 10 which is itself articulated on the chassis 1 and the connecting means 8. The latter allows the mower to be coupled to a tractor vehicle (not shown) which ensures both the displacement in a direction of advance A and the driving of the various elements of the mower.

The chassis 1 carries a harvesting mechanism 11. The latter is constituted by a gearbox 12 carrying cutting elements 13, which are intended to be driven in rotation by means of transmission elements 14 coming from the tractor into the gearbox 12. This harvesting mechanism 11 can, in addition, comprise means for treating the mown products. The harvesting mechanism 11 is connected to the chassis 1 by means of a suspension device 15 allowing a heightwise displacement of said harvesting mechanism 11 with respect to the chassis 1. This suspension device 15 is composed of two lower rods 16 and of at least one upper rod 17. The lower rods 16 are located on the lateral sides of the machine and are articulated on the harvesting mechanism 11 by means of axes 18 and on the balance bars 5 of the chassis 1 by means of axes 19. The upper rod 17 is further away from the ground than the lower rods 16 and is articulated on the harvesting mechanism 11 with an axis 20 and on the chassis 1 by means of an axis 21. These articulation axes 18, 19, 20 and 21 are all substantially horizontal and substantially perpendicular to the direction of advance A.

The mower according to the invention also comprises a lightening device 22 of the harvesting mechanism 11. It can be seen from FIGS. 2, 3 and 4 that this lightening device 22 is constituted by two torsion bars 23 and 24 which are connected to the beam 2. Each of these torsion bars 23 and 24 extends from the middle of the machine up to one of the lateral uprights 3 of the chassis 1 and carries at its lateral end a lever 25 having itself two ends situated one at the back and one at the front (viewed in the direction of advance A) of said lateral end of the corresponding torsion bar 23 or 24. On the rear end of said lever 25 there is articulated, by means of an axis 26, a rod 27 which is directed towards the harvesting mechanism 11 and which is articulated by means of an axis 28 on the lower rod 16 of the suspension device 15. This axis 28 is located in the vicinity of the cutting elements 13 of the harvesting mechanism 11, but it could also be located directly on said harvesting mechanism 11.

In the example shown, the lightening device 22 has two torsion bars 23 and 24 ensuring the lightening of the harvesting device by its two sides. Said lightening device 22 could, however, comprise only a single torsion bar 23 or 24 lightening the harvesting mechanism 11 by any one of its sides.

Figure 4:
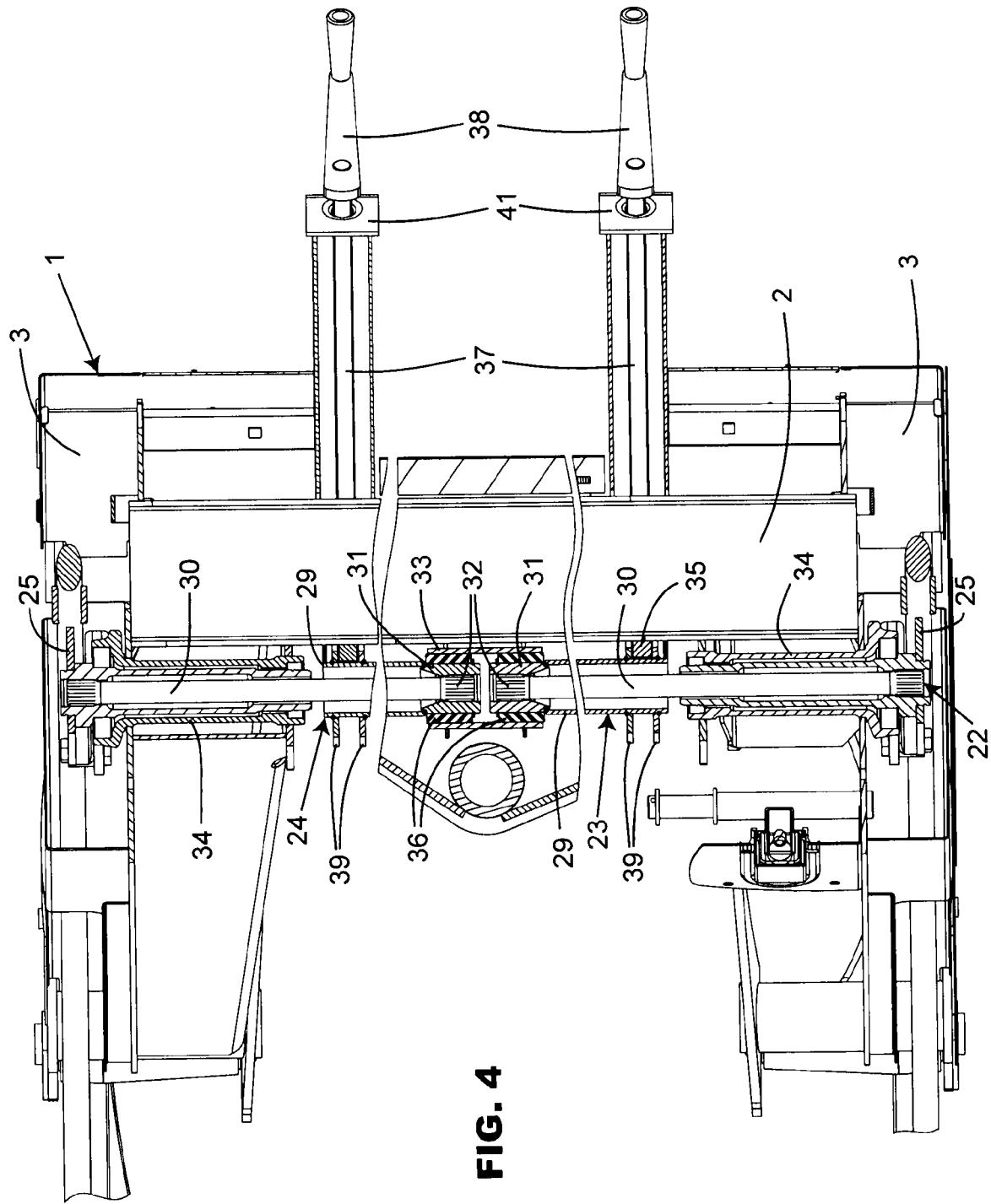
FIG. 4 represents, on a larger scale, longitudinal sections of the lightening device according to the invention.

It can be seen in particular from FIG. 4 that each torsion bar 23, 24 is composed of a tube 29 in the interior of which a stem 30 is arranged having a first end which is connected to said tube 29 and a second end which passes beyond the latter and which carries the corresponding lever 25. Each tube 29 and the corresponding stem 30 are assembled by means of a sleeve 31. In the example which is shown, each tube 29 is welded to the corresponding sleeve 31 whereas each stem 30 is linked to said corresponding sleeve 31 by channels 32.

Each torsion bar 23, 24 is mounted on the chassis 1, on one hand, by means of a sheath 33 which is rigidly fastened to the beam 2 and, on another hand, by means of a guide bearing 34 which is rigidly fastened to the corresponding lateral upright 3. In addition, the tube 29 of each torsion bar 23, 24 rests on a curved abutment 35 which is rigidly fastened to the beam 2. Rubber rings 36 are placed between each torsion bar 23, 24 and the sheath 33. These facilitate the introduction in the sheath 33 of said torsion bars 23, 24 and ensure for them a certain freedom of movement in said sheath 33.

Figure 5:
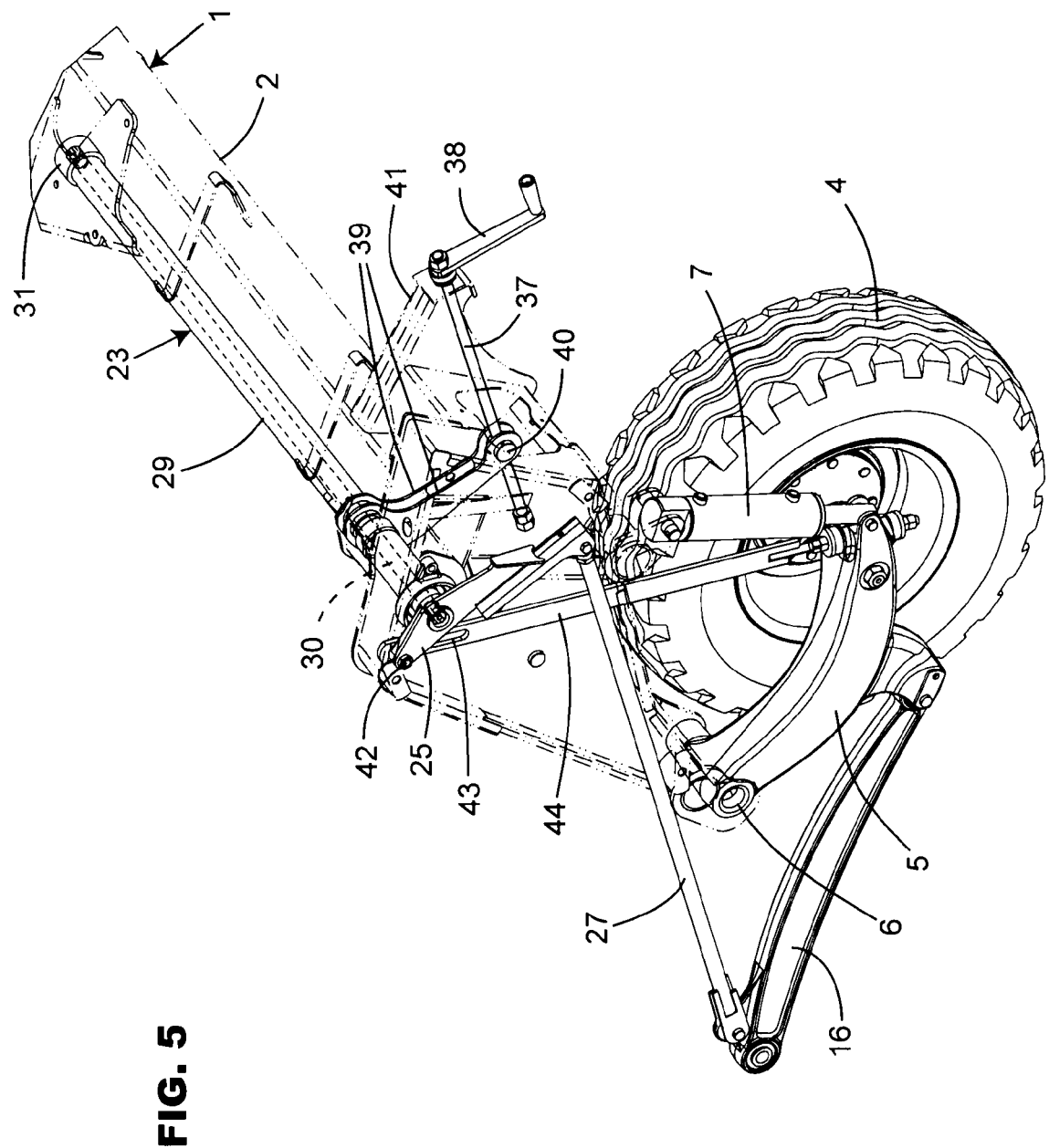
FIG. 5 represents a detail view of the lightening device according to the invention.

The lightening effort of each torsion bar 23, 24 is adjustable by means of threaded rods 37 with handles 38 to manoeuvre them (see FIG. 5). To this effect, each tube 29 comprises two lugs 39 between which there is arranged a nut 40 which is passed through by one of said threaded rods 37. These threaded rods 27 are mounted freely in rotation but fixed in translation in supports 41 which are fixed on the beam 2 of the chassis 1. The rotation of these threaded rods 37 causes a displacement of the nuts 40 and of the lugs 39 which then cause the tubes 29 and the stems 30 to turn on themselves so as to twist them a little more or a little less. This allows the tightening of these latter to be increased or reduced and to thus adjust the lightening effort.

The lever 25 of each torsion bar 23, 24 comprises at its front end, i.e. opposite to that which carries the rod 27, a roller 42. The latter is guided in an oblong orifice 43 of a tie-bar 44 which is, furthermore, connected to the balance bar 5 carrying a wheel 4 of the machine. The oblong orifice 43 allows the unit constituted by the harvesting mechanism 11, the rod 27 and the lever 25 to move heightwise to follow the unevennesses of the ground.

During work, the harvesting mechanism 11 is located on the surface of the ground as represented in FIG. 3. The chassis 1 and the threaded rods 37 therefore allow the tightening of the torsion bars 23 and 24 to be increased or reduced so as to modulate the lightening effort exerted on the harvesting mechanism 11 by means of the levers 25 and the rods 27. Thus, when the terrain comprises numerous unevennesses constituted by bumps and hollows, the lightening can be increased to allow the cutting elements 13 to easily follow these unevennesses and to ensure a correct cutting. The lightening can also be increased when the products which are to be cut are dense and heavy and have a tendency to flatten the harvesting mechanism 11 to the ground. Conversely, the lightening can be reduced, for example, in the cases where the products are not very dense. This therefore allows a rapid advancement during work, with the harvesting mechanism nevertheless remaining constantly in contact with the ground.

For transport or for passing over windrows formed by products which have already been cut, the chassis 1 and the harvesting mechanism 11 can be raised to bring them away from the surface of the ground (see FIG. 2). To obtain this position, the hydraulic jacks 7 are actuated so that they lengthen. Firstly, the front parts of the balance bars 5 are lifted about the axes of the wheels 4 and raise the chassis 1. The rollers 42 of the levers 25 then move upwards in the oblong orifices 43 of the tie-bars 44. These latter are almost motionless or are even displaced slightly downwards by the rear ends of the balance bars 5. As soon as the rollers 42 reach the upper ends of the oblong orifices 43, the tie-bars 44 exert a traction which causes the levers 25 to turn with the torsion bars 23, 24 in the direction in which the lightening efforts are increased. The levers 25 then draw the rods 27 upwards such that the latter drive the harvesting mechanism 11 in the same direction, causing it to pivot by means of the suspension device 15 with respect to the chassis 1. The simultaneous displacements operated by the chassis 1 and the suspension device 15 allow a rapid raising of great amplitude of the harvesting mechanism 11. In this position, the distance of said mechanism 11 with respect to the ground is such that it can pass without difficulty over the obstacles which could be encountered on the ground.

The inverse displacement of the harvesting mechanism 11, to bring it into work position, is obtained by shortening the hydraulic jacks 7.

It is readily evident that the invention is not limited to the embodiment described above and represented in the attached figures. Modifications remain possible, in particular with regard to the constitution or the number of the various elements or by substitution of technical equivalents, without, however, departing from the scope of protection.

What is claimed as new and desired to be secured by Letters Patent of the United States is:

1. A mower comprising:
   a chassis including a transverse beam and lateral uprights provided with wheels,
   a connecting unit configured to connect said chassis to a motor vehicle,
   at least one harvesting mechanism provided with cutting elements,
   a suspension device connecting said harvesting mechanism to the chassis, allowing a heightwise displacement of said harvesting mechanism with respect to the chassis,
   a lightening device of said harvesting mechanism,
   wherein the lightening device includes torsion bars which are connected to the transverse beam of the chassis and which torsion bars each include a tube in the interior of which tube there is arranged a stem that includes
   a first end which is linked to said tube via a sleeve and
   a second end which passes beyond said tube and which carries a lever on one of the ends of which lever there is articulated a rod which is directed towards the harvesting mechanism and which is itself articulated on said harvesting mechanism or its suspension device, and the stem is rotationally fixed to the tube.

2. The mower according to claim 1, wherein each torsion bar is engaged in a sheath which is rigidly fastened to the transverse beam of the chassis.

3. The mower according to claim 2, wherein rubber rings are placed between each torsion bar and the sheath.

4. The mower according to claim 1, wherein the lightening effort of each torsion bar is adjustable.

5. The mower according to claim 4, wherein the tube of each torsion bar carries lugs which are displaceable by means of a threaded rod so as to make said tube and the corresponding stem turn on themselves to increase or decrease the tightening of the tube and of the stem.

6. The mower according to claim 1, wherein the lever of each torsion bar comprises, at its end opposite to that which carries the rod, a roller guided in an oblong orifice of a tie-bar connected to the balance bar carrying a wheel of the chassis.

7. The mower according to claim 1, wherein the torsion bars comprise first and second torsion bars extending away from each other.

8. The mower according to claim 7, wherein the first and second torsion bars extend from the middle of the mower.

9. The mower according to claim 1, wherein the stem is rotationally fixed to the tube via a channel and the sleeve.

* * * * *